(12) United States Patent
Schofield

(10) Patent No.: US 7,854,910 B1
(45) Date of Patent: Dec. 21, 2010

(54) AIR PREHEATER DESIGN THAT CONTROLS MERCURY EMISSIONS IN EXHAUST GASES AND METHOD OF OPERATION OF THE SAME

(76) Inventor: Keith Schofield, 1617 Paterna Rd., Santa Barbara, CA (US) 93103

( * ) Notice: Subject to any disclaimer, the term of this patent is extended or adjusted under 35 U.S.C. 154(b) by 0 days.

(21) Appl. No.: 12/765,549

(22) Filed: Apr. 22, 2010

(51) Int. Cl.
B01D 53/64 (2006.01)
B01D 53/74 (2006.01)

(52) U.S. Cl. ............... 423/210; 422/168; 422/173; 422/198

(58) Field of Classification Search ............ 423/210; 422/168, 173, 198

See application file for complete search history.

(56) References Cited

U.S. PATENT DOCUMENTS 7,517,511 B2 * 4/2009 Schofield ............ 423/213.5

* cited by examiner

*Primary Examiner*—Timothy C Vanoy
(74) *Attorney, Agent, or Firm*—Daniel L. Dawes; Marcus C. Dawes

(57) ABSTRACT

A conventional air preheater or the conventional design of a preheater is split into two separate sections which are then communicated or connected by a thermally insulated reaction section that is maintained within a predetermined temperature range selected for optimization of heterogeneous chemideposition of mercury. The reaction section contains thin stainless steel sheeting which provide an enhanced area of collisional surfaces. Testing has confirmed that this design modification alters the energy heat exchanger to also enhance the oxidation of gaseous elemental mercury in combustion or high temperature source flue gases by providing the surfaces and time for the heterogeneous mechanisms to occur and so control mercury emissions in exhaust gases from coal combustion or other high temperature systems that contain traces of mercury.

20 Claims, 2 Drawing Sheets

AIR PREHEATER DESIGN THAT CONTROLS MERCURY EMISSIONS IN EXHAUST GASES AND METHOD OF OPERATION OF THE SAME

BACKGROUND OF THE INVENTION

1. Field of the Invention

The present invention relates to modifying a waste heat exchange device in cooling exhaust gases for the purposes of removal of elemental mercury from the exhaust gases using chemi-deposition (heterogeneous (gas/surface) interactions).

2. Description of the Prior Art

Many American states and the U.S. Environmental Protection Agency are on the point of legislating mercury emission controls in the very near future. As a result, many testing programs have been underway in recent years to provide practical methods that might apply primarily to the coal industry, and possibly also to incineration, cement plants and metal smelting industries that also encounter this problem. Although many suggested methods have been proposed, few have been found to be adequate for the practical demands of full-scale industry.

Currently the two major contending methods that are being recommended by organizations such as The Electric Power Research Institute and the U.S. Department of Energy are those of invoking activated charcoal injection into the cool flue gases or alternatively to mix bromine in some form with the fuel. The concept of using activated charcoal arose from the known fact that in coal combustion a small fraction of the mercury is found on the resulting fly ash. Attempts to manipulate the nature of the fly ash itself to enhance its efficiency have seen only limited success. Efficiencies appear to be roughly correlated to the amount of unburned carbon in the fly ash. However, companies are reluctant to reduce the efficiencies of their combustors so as to produce ash that in essence has not fully burned. Moreover, fly ash often is sold as an ingredient of concrete, but can only have about 4% carbon content otherwise becomes unacceptable. As a result, emphasis has been in the development of activated charcoal addition by spraying it as fine particles into the cool flue gases downstream. However, this is a very inefficient interaction that is still not understood except that the mercury does appear chemically and stably absorbed. Nevertheless, many thousands of carbon atoms have to be used to remove one atom of mercury. As a result of such low efficiencies, enhancements have been developed using pre-treated activated charcoals. These are available and can contain sulfur, chlorine or bromine doping. The method can be effective but remains expensive and labor intensive. If fly ash sales are involved, it requires two particle removal systems, one for the fly ash followed by one for the activated charcoal. Also, there always remains the possibility of these wastes becoming defined as toxic materials which would elevate costs.

A second method shown in B. Vosteen et al., "Process for Removing Mercury from Flue Gases," U.S. Pat. No. 6,878,358, April, 2005, incorporated herein by reference, is very elegant in having discovered that additions of bromine can enhance conversion of the atomic mercury. Gaseous mercury dibromide is produced that is water soluble and can be removed by sulfur scrubbers currently in widespread use. Bromine is seen to be much more efficient than chlorine in such interactions. Its limitation however is that bromine or its salts are far less abundant than chlorine and remain rather expensive introducing a financial hurdle for wide general usage.

Other methods that are known invoke the presence of high levels of chlorine in the system. This can be achieved either by additions of chlorine or by blending fuels one of which is very rich in chlorine. Again this can significantly elevate efficiencies but chlorine is a highly corrosive element and detrimental to combustor systems. The Selective Catalytic Reducer (SCR) now being utilized in certain plants for reducing nitric oxide (NO) to the regulated allowable emission levels contains many catalytic surfaces and generally operates in a temperature range of about 340-380° C. (640-710° F.). Because of previous work that supported the use of catalysts to convert atomic mercury, it was hoped that the SCR could be made to do double duty and also reduce mercury emissions. However, after extensive testing it now appears that only limited conversions can be achieved. The difficulties are that the temperatures in the SCR are too high for mercury conversion and also the required addition of ammonia needed to reduce NO are contrary to the conditions sought by the mercury. The optimization of either causes a detriment to the other.

Many other patents have been published in the past based on absorbing atomic mercury by its amalgamation or catalytic properties. These have all been considered and some tested but none found to be satisfactorily practical for industrial large scale applications.

As a result, although the prior art in mercury control methods has examined this problem in depth it has failed in creating a practical low cost device by which mercury emissions can be controlled especially for application to the coal industry. Coal remains a major global fuel and as a result requires a simple method that can be invoked globally without significant cost. The present method of redesigning the air preheater device has never been considered before. Preliminary pilot-plant testing under realistic coal combustion conditions now has validated the concept. It supports the practical application of such a modification to this well known piece of equipment that is invariably necessary as a waste heat exchanger in any power plant system. It has not been realized until now that it can do double duty and also efficiently act as a mercury conversion and control device.

BRIEF SUMMARY OF THE INVENTION

The illustrated embodiments of the present invention relate to a modification of the design of a waste heat exchange device to cool exhaust gases. In cases where these gases may contain elemental gaseous mercury the device now has been redesigned to also convert the elemental mercury to a molecular compound form. If chlorine is present in the gases this molecular form, mercury dichloride, will vaporize from the air preheater and can be easily removed downstream of the device. In the total absence of chlorine, either additions of this to the boiler can be made in one of its molecular forms, otherwise mercury oxide or mercury sulfate will collect within the device and can be removed later in the normal air preheater cleaning cycles.

The illustrated embodiments of the present invention specifically address and alleviate the above mentioned deficient limitations of the prior art. According to the illustrated embodiments the air preheater section of the flue gas ducting is utilized as a region for controlling mercury. Although there have been more than a thousand patents issued on air preheaters none of their designs are capable of significantly affecting mercury. A totally different design is required. What is disclosed here is the splitting of the air preheater into two sections with an isolated section in its center where the mercury modification can be achieved by providing a stable temperature and sufficient time for the heterogeneous conversion to occur. The illustrated device does not noticeable increase the cost of manufacturing the air preheater. Its heat exchange performance remains the same but is now divided between its two sections. As a result the present device is both effective and economical.

More particularly, the illustrated embodiments include an apparatus for extracting energy from an exhaust gas and for removal of mercury, which apparatus includes a first section of an exhaust gas heat exchanger for receiving a flow of the exhaust gas, for extracting energy from the exhaust gas and for cooling the exhaust gas to a first predetermined temperature range. A reaction chamber communicating with the first section for receiving the exhaust gas at the predetermined temperature range that provides an adequate or predetermined collision frequency of the exhaust gas in the reaction chamber with the available surfaces whereon chemi-deposition of mercury occurs, and a second section of the exhaust gas heat exchanger for receiving the flow of the exhaust gas from the reaction chamber, for extracting energy from the exhaust gas and for cooling the exhaust gas to a second predetermined temperature range for exhaust. While small or trace amounts of chemi-deposition on exhaust gas flue surfaces might occur in some locations in conventional preheaters, the temperature ranges are never in the correct range in a large enough volume and the degree of collisions is never high enough to provide effective or any practical degree of chemi-deposition of Hg. Thus, it is to be understood according to the spirit of the invention that the predetermined temperature range is that range which suited to provide chemi-deposition at a rate which will yield the designed or practical amounts of Hg conversion from the exhaust gas. It is also understood according to the teachings of the invention that an adequate or predetermined collision frequency of the exhaust gas in the reaction chamber with the available surfaces is also that degree of collision frequency where chemi-deposition of mercury on the available surfaces in the reaction chamber occurs to yield the designed or practical amounts of Hg conversion from the exhaust gas.

The apparatus further includes a mechanism for removing one or more mercury compounds from the exhaust gas and/or reaction chamber. These means include, but are not limited to, a cold-side electrostatic precipitator, a fabric filter bag, or a lime scrubber. There are innumerable methods and mechanisms for removing one or more mercury compounds from the exhaust gas and/or reaction chamber, once elemental mercury has been converted into some compound of mercury, and all such methods and mechanisms are expressly contemplated as within the scope of the invention.

The reaction chamber is thermally insulated to maintain a predetermined range therein. The illustrated embodiment includes a first section of an exhaust gas heat exchanger which establishes a predetermined temperature range about $500 \pm 50°$ F. ($260 \pm 30°$ C.). Any temperature range and dwell time which provides a practical number of chemi-deposition reactions with the elemental mercury are included within the spirit and scope of the invention.

In one embodiment the reaction chamber comprises at least one sheet or a plurality of sheets arranged and configured to provide a collision surface for elemental mercury in the exhaust gas. The sheet or the plurality of steel sheets are arranged and configured to provide a plurality of collision surfaces for elemental mercury in the exhaust gas. This arrangement and configuration includes a plurality of corrugated or honeycombed stainless steel sheets providing a plurality of collision surfaces for elemental mercury in the exhaust gas. The sheets are in one embodiment also seg-mented. In the illustrated embodiment the sheets are closely spaced, thin, segmented, corrugated or honeycombed stainless steel sheets providing a plurality of collision surfaces for elemental mercury in the exhaust gas. For example, the plurality of sheets are arranged and configured to provide on the average five or more collisions with the sheets for each atom of elemental mercury in the exhaust gas. Further, the plurality of sheets are in another embodiment arranged and configured to substantially minimize or reduce laminar streamline flow of the exhaust gas over the sheets.

The second section of the exhaust gas heat exchanger cools the exhaust gas to about 360° F. (180° C.) or less. The exhaust gas exit temperature may be varied according to the specification of the application on hand.

The illustrated embodiments of the invention also contemplate the inclusion of a retrofitted modification of an existing or previously installed exhaust gas preheater arranged and reconfigured to provide an exhaust gas flow with a predetermined temperature range. The retrofitted modification of an exhaust gas preheater includes a reconfiguration of the preheater to provide an exhaust flow in the temperature range of about $500 \pm 50°$ F. ($260 \pm 30°$ C.), a reaction chamber communicating with the configured preheater for receiving the exhaust gas at the predetermined temperature range and that provides an adequate or predetermined collision frequency of the exhaust gas in the reaction chamber with the available surfaces whereon chemi-deposition of mercury occurs, and an exhaust gas heat exchanger for receiving the flow of the exhaust gas from the reaction chamber, for extracting energy from the exhaust gas and for cooling the exhaust gas to a predetermined temperature range for exhaust.

The illustrated embodiments of the invention also include a method for extracting energy from an exhaust gas and for removal of mercury comprising the steps of extracting energy from the exhaust gas to cool the exhaust gas to a first predetermined temperature range for chemi-deposition, reacting the cooled exhaust gas at the predetermined temperature range and with an adequate or predetermined collision frequency of the exhaust gas with one or more collision surfaces whereon chemi-deposition of mercury occurs, and extracting energy from the reacted exhaust gas to cool the reacted exhaust gas to a second predetermined temperature range for exhaust.

The method further comprises the step of removing one or more mercury compounds from the exhaust gas and/or reaction chamber.

The step of extracting energy from the exhaust gas to cool the exhaust gas to a first predetermined temperature range for chemi-deposition comprises the step of cooling the exhaust gas to a temperature range of about $500 \pm 50°$ F. ($260 \pm 30°$ C.).

The step of reacting the cooled exhaust gas at the predetermined temperature range and with an adequate or predetermined collision frequency of the exhaust gas with one or more collision surfaces whereon chemi-deposition of mercury occurs comprises the step of providing on the average five or more collisions with the sheets for each atom of elemental mercury in the exhaust gas.

The illustrated embodiments of the invention also include a method of retrofitting an existing or previously installed exhaust gas preheater arranged and reconfigured to provide an exhaust gas flow with a predetermined temperature range comprising the steps of adjusting the preheater to provide an exhaust flow in the temperature range of about $500 \pm 50°$ F. ($260 \pm 30°$ C.), a reaction chamber communicating with the configured preheater for receiving the exhaust gas at the predetermined temperature range and that provides an adequate or predetermined collision frequency of the exhaust gas in the reaction chamber with one or more collision surfaces whereon chemi-deposition of mercury occurs, and communicating an exhaust gas heat exchanger with the reaction chamber for receiving the flow of the exhaust gas from the reaction chamber, for extracting energy from the exhaust gas and for cooling the exhaust gas to a predetermined temperature range for exhaust.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

BRIEF DESCRIPTIONS OF THE DRAWINGS

Figure 1:
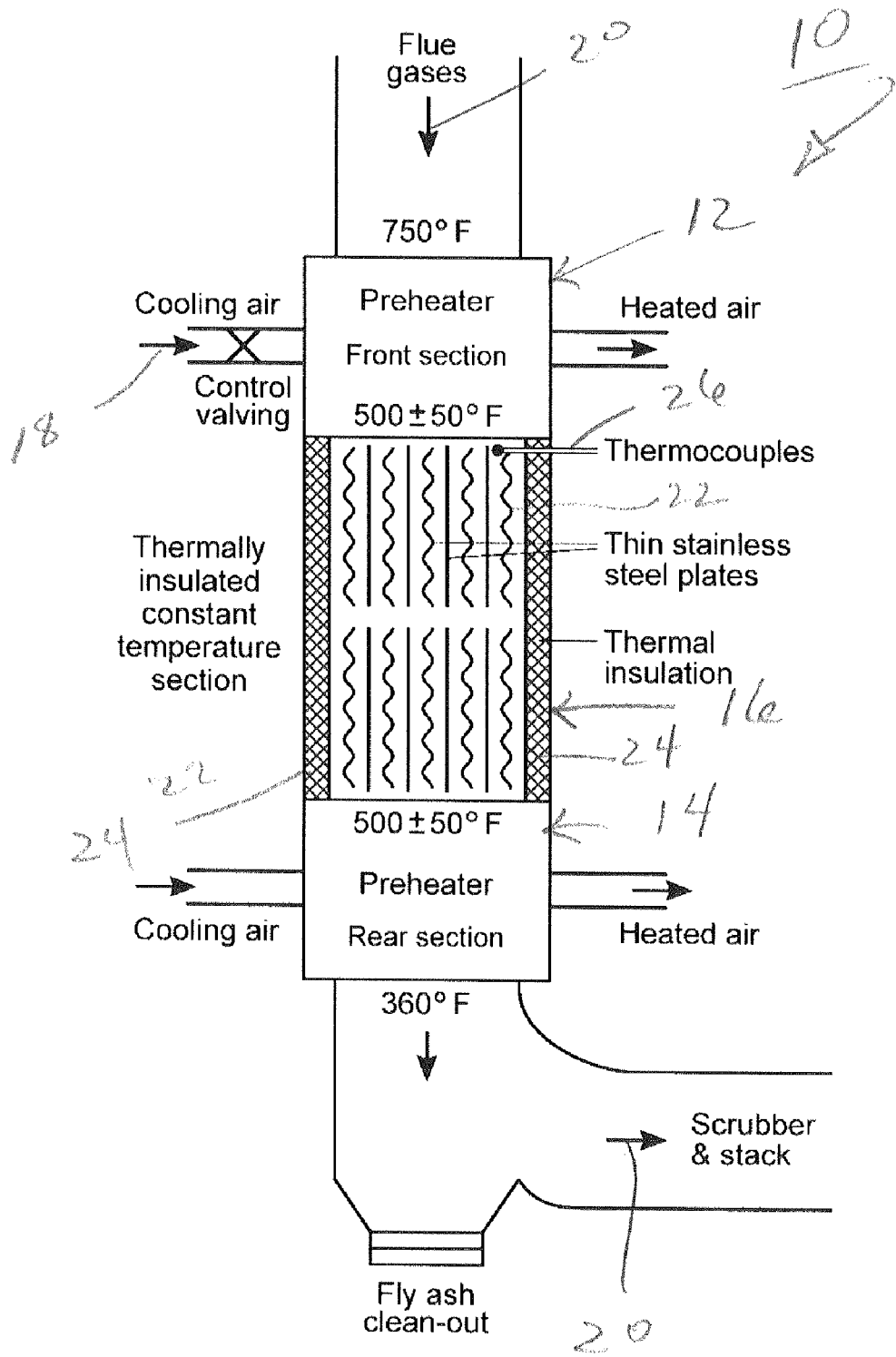
FIG. 1 is a simplified diagram of the illustrated embodiment of the invention that can be utilized in normal air preheater modes.
Figure 3:
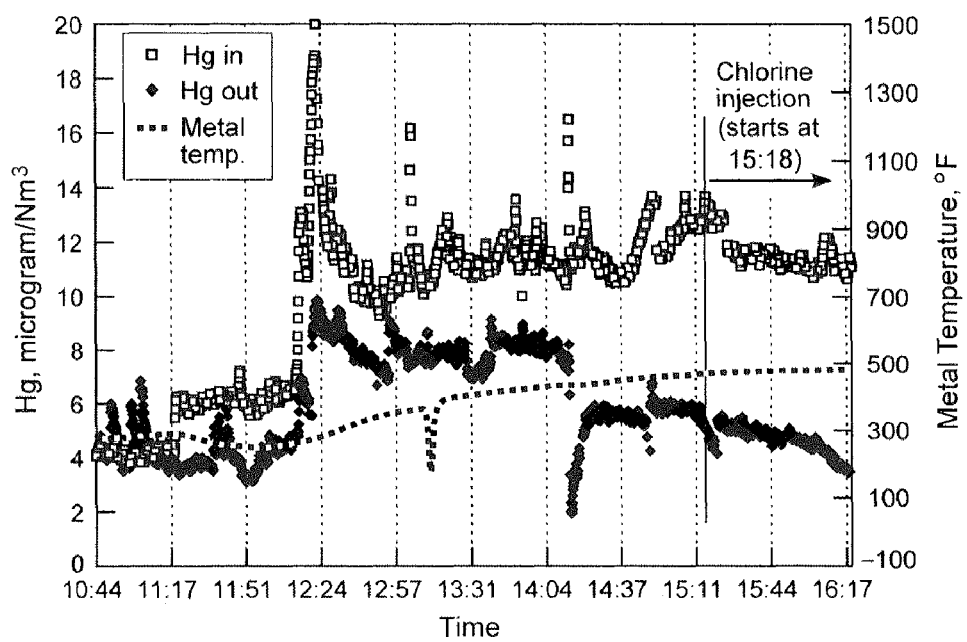

FIG. 3 is a graph of the density of elemental mercury and metal temperature as a function of time in an illustrative pilot plant test in a coal fired facility fitted with a prototype device of the illustrated embodiment of FIG. 1. The top curve, plotted with hollow squares, refers to the concentration of atomic, elemental gaseous mercury in the flue gases entering the central section of the air preheater while the center curve, plotted with solid diamonds, is the corresponding value of atomic mercury that exits. The lower curve, plotted in smaller solid squares, is the temperature of the metal surfaces in the central region that is gradually being increased during this test.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE ILLUSTRATED EMBODIMENTS

Traces of mercury are found in coal, waste materials, metal ores and minerals such as limestone. Consequently, those industries that use these materials in a high temperature mode have the potential for emitting mercury in their exhaust. Mercury has no condensed molecular forms that are stable at temperatures above about 1300-1500° F. (700-800° C.) and so any such process operating above these temperatures will produce elemental gaseous mercury. Elemental gaseous mercury is quite unreactive in the gas phase, but evidence of its interaction with fly ash and activated charcoal particles has indicated an affinity for heterogeneous (gas/surface) interactions, also referenced in this specification as chemi-deposition. Recent developments with the selective catalytic reactor (SCR), now being introduced in full-scale coal combustors to lower nitric oxide ($NO_x$) emissions to new regulated levels, illustrates some heterogeneous catalytic oxidation of the mercury. This conversion to the gaseous dichloride is important due to its stability and more importantly because it is water soluble and can be removed with limestone desulfurization scrubbers that are now common. Also due to its slight acidic nature it can also be removed by dry scrubbers based on lime powders. However, the recently considered hope for the SCR to be a double duty device removing both $NO_x$ and Hg now has been reported as indicating only low efficiencies and a high level of chlorine is necessary in order to obtain any practical extent of Hg removal. For coals such as the very common West American Powder River Basin, which are low in chlorine, the SCR provides a minimal contribution.

Based on the illustrated embodiment of the invention that this minimal contribution may be because the temperatures are too high in the SCR, the present work was initiated and tested in a coal fired pilot plant at the Western Research Facility in Laramie, Wyo. Full scale combustors nowadays strive for high thermal efficiencies and tend to minimize any waste heat losses. Consequently, in the cooling of flue gases, after devices such as a hot-side electrostatic precipitator used to remove particles and an SCR, the temperatures are still generally about 750° F. (400° C.). This constitutes a significant gaseous energy content and invariably a preheater is installed at this location to extract this energy in the form of heated air or water to be utilized elsewhere in the plant cycle and improve overall efficiencies. The heat removal also lowers the temperatures to levels required by any remaining downstream control devices such as fabric filter bags and desulfurization scrubbers. Air preheater design is now well advanced and well modeled by fluid dynamic theory. Preheaters are designed specifically for a particular power plant and scaled to size for required input and outlet exhaust gas temperatures. Generally, designs at present are used to cool the gases from about 750° F. (400° C.) to about 360° F. (180° C.). As a result, preheaters currently have a steep temperature gradient through their length.

The basis of the illustrated embodiments of the present invention is the concept that mercury appears to have heterogeneous chemical channels, referenced here as chemi-deposition, whereby it can convert to its thermodynamically predicted product mercury dichloride. However, the nature of mercury's chemistry restricts the success of these mechanisms to lower temperature regimes and moreover a sufficient time is required to permit the number of collisions to occur within this functioning range of lower temperatures. As a result, in conventional systems at present, little natural Hg conversion is seen because of the rather severe time, temperature and gas/surface interaction constraints that exist for chemi-deposition to efficiently occur. Chemi-deposition is more fully described in U.S. Pat. No. 7,517,511, which is incorporated herein by reference.

Turn now to the preheater design and methodology of the illustrated embodiments wherein the above insights are employed. FIG. 1 is a simplified illustration of the device 10 that can be utilized in normal air preheater modes. Conventional air preheater technology is utilized as a starting point, but according to the illustrated embodiment is split into two sections 12 and 14 with a reactive chamber 16 between them. The first section 12 reduces the exhaust temperature to the desired temperature range by control of the input cooling air flow 18. The exhaust 20 then passes into a central well-insulated region or reactive chamber 16, having insulated walls 24, and the gas flow maintains this section at the desired temperature of about 500±50° F. (260±30° C.) This chamber 16 contains a predetermined square footage of thin stainless steel sheets 22 placed parallel to the flow and spaced apart. Chamber 16 is scaled in size to satisfy the desired level of control. This is connected or communicated to the second section 14 of the air preheater 10 which cools the exhaust 20 to the final temperature required by the plant design. Thermocouples 26 are provided at the input to chamber 16 to monitor the input temperature of gases 20 entering chamber 16 with the flow 18 being controlled to maintain the temperature within the predetermined range to maximize or substantially increase Hg chemi-deposition. Sheets 22 are composed of stainless steel in the illustrated embodiment, but it is to be expressly understood that any composition surface suitable for chemi-deposition may be employed. Additional choices include any material which is now known or later determined to be durable in an exhaust gas environment, including but not limited to non-noble metals and alloys, ceramics, refractory materials or temperature and chemically stable composites.

To recap, FIG. 1 is a conceptual design aimed at providing the required space in which the mercury can convert to the dichloride by interacting on the surfaces of thin sheets 22 of stainless steel that lie parallel to the exhaust flow. A conventional heat exchanger is thus modified and redesigned in three sections 12, 14 and 16. The first section 12 is an air preheater scaled to reduce the exhaust temperature from its input temperature to the desired temperature range of about 500±50° F. (260±30° C.). Thermocouples 26 measuring input temperatures to the central section 16 are ganged to control the air flow through the first section 12 to maintain this required constant temperature range in the central section 16. The closely spaced, thin stainless steel plates 22 in the central section 16 can be in the multitude of shapes that have been found to maximize or substantially increase gas/surface collision rates. The spacing and square footage of sheets will scale with power plant size and the extent of control required. Sheet thickness is solely defined by a requirement of adequate structural strength. The sheets lie parallel to the flow direction and can consist of slight corrugations or angular bending or even in honeycomb formats but such that back pressure effects remain within the limits of overall plant designs. It must be understood that the angular or folding of sheets 22 may assume any geometry now known or later devised which provides sufficient opportunity for collision with elemental mercury, yet allows for an acceptable back pressure or resistance to flow when in its installed configuration. For example, it is within the scope of the invention that in an appropriate design, sheets 22 may actually take the form of a complex array of baffles, bent flaps punched out from a flat sheet, reticulated open foam, wire wool retained in reinforced frames or any kind of labyrinthian structure or convoluted surface. There are an innumerable number of possible geometric or structural forms through which a collisional surface may be provided. For simplicity of construction, economy and robustness of design the illustrated embodiment utilizes corrugated or honeycombed sheets 22. Available surface areas are scaled to desired control levels. The central section 16 is thermally well insulated as indicated in FIG. 1. In this way the whole section 16 becomes thermally equilibrated and the steel plates 22 all acquire surface temperatures similar to those of the passing flue gases 20. Minimal thermal losses will exist at the ends of plates 22 due to normally encountered conductivity or radiation mechanisms.

Figure 2:
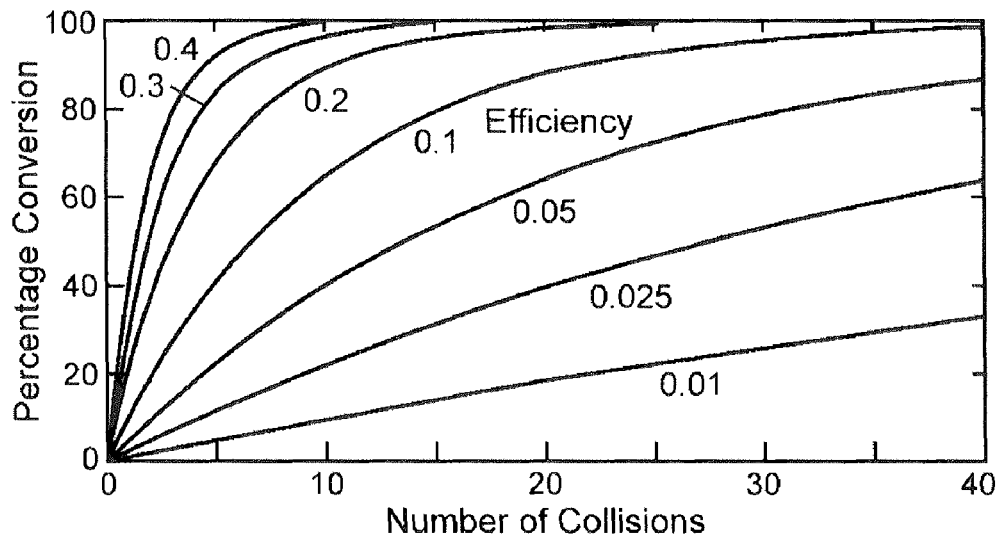
FIG. 2 is a graph of the percentage of conversion verses the number of collisions necessary between the flue gases and a surface to acquire a specific conversion for heterogeneous processes of differing collisional efficiencies. The present process relates to the 0.3 or 30% collisional efficiency curve.

As indicated in FIG. 2, for a collisional or chemi-deposition process as is being witnessed here, the overall conversion efficiency is primarily controlled by the number of collisions between the gas and the surface and the unit collisional efficiency of the interaction at the specific conditions. The present process is seen to be very efficient, namely 30% or appropriate to the 0.3 curve of FIG. 2. Nevertheless, as seen by these curves, because each subsequent collision is a function of a gradually lowered concentration of elemental mercury, the curves are not linear. Consequently, even with a 0.3 collisional efficiency, five successful collisions are needed for an 80% conversion, seven to 90%, ten to 96% and fifteen to 99%. It is because the mercury is at such very low concentrations particularly in coal fueled exhausts (typically 10 parts per billion by volume) and because the total volume of exhaust to be processed via the surface is high, Hg removal is a demanding task even with an efficient reaction mechanism. As a result, the available or effective square footage of surface area at the optimum conditions in the central section 16 is determined by the desired level of Hg removal which is sought. Additionally, methods are utilized such as corrugating surface shapes to optimize gas/surface collisions and prevent any streamlining of the flows. As indicated diagrammatically in FIG. 1, a plurality of individual plate lengths can be used. This is to enhance collisions as much as possible by having the gases exit one section and then find their way through the next without increasing back pressures to any degree. It must thereby be understood that the scope of the invention includes any configuration of plates 22 designed according to the disclosed principles of setting collision frequency at a level high enough to obtain the required Hg removal of the design specifications, while maintaining an acceptable back pressure created by central section 16 within the design specifications of the preheater 10.

As a result, the exhaust still at 500±50° F. (260±30° C.) then enters the third stage 14 which again is the second part of the air preheater cooler taking the temperature down to its prescribed exit temperature of about 360° F. (180° C.). Now however the mercury will be present predominantly as stable dichloride and will from this point either be absorbed onto any remaining ash particles and removed either by a cold-side electrostatic precipitator or fabric filter bag, or scrubbed out from the exhaust gas along with sulfur dioxide into a gypsum product of a lime scrubber.

In a second embodiment of the invention it is plausible to retain a conventional air preheater in a pre-existing power plant and retrofit the design of the illustrated embodiments into it. The already in-place air preheater can act as the first stage 12 of the modified design, but its air flow reduced to only cool the flue gases from 750° F. (400° C.) to the required 500±50° F. (260±30° C.). Such a retrofit constitutes a significant saving in capital expenditures especially as this first stage cooling removes about two-thirds of the waste heat. A second constant temperature chamber 16 can be added at its exit along with the smaller second part 14 of the air preheater cooler taking the temperature down to its required exit temperature of about 360° F. (180° C.).

Turn now and consider some pilot plant testing and results of an embodiment of the invention. To validate this concept, a series of experiments were completed in a pilot plant at the Western Research Center in Laramie, Wyo. This is a nominal 250,000 Btu/hr balanced draft system designed to reflect the pulverized coal-fired utility boiler of the Tucson Electric Power Generating Station in Springville, Arizona. It simulates a tangential-fired boiler and consumes about 30 lbs/hr of coal. It produced a realistic downstream duct section of exhaust flow that contained mercury at concentrations similar to and in a flow composition corresponding to that of full-scale combustors.

In a first configuration a 316 stainless steel tubular honeycomb design was utilized as a two foot long central section of the air preheater design. A test program with rather severe conditions was initiated because it was felt that the mercury could readily be converted when it was free of previous constraints. This was to use a low chlorine/low ash Powder River Basin coal from the Eagle Butte mine near Gillette, Wyo. The burnt coal contained 0.1 microgram/gram of Hg and analyses of the 70 mesh pulverized coal samples burned on differing days implied a chlorine content of only 22, 71 and 60 microgram/gram. The sulfur content was about 0.5% and ash 5%. In this plant with such a coal, the expected normal baseline of mercury conversion would be less than 10%. The coal feed system consisted of screw-based feeders and pneumatic transport utilizing primary air to four burners inserted in the corners of a refractory-lined firebox. Secondary air and overfire air were adjustable to maintain the excess oxygen concentration in the 4-5% range. Testing was done on a daily basis initiating combustion early in the morning and collecting data automatically throughout the day until turn off. The system was started with natural gas and as temperatures rose to then supplement and finally replace this by the slow gradual injection of the pulverized coal feed until its rate was about 30 lbs/hr and stable coal combustion achieved. Because of this mode the system took a long time to approach steady state conditions and the downstream locations were gradually heating up through the day. In reality this was advantageous because the temperature in the test section slowly increased through a test-day enabling performance to be monitored continually and illustrated performance through a wide temperature regime.

Testing involved measurement of the concentration of elemental atomic mercury just ahead of the device 10 and directly behind it. Thermocouples 26 attached to the front metal surfaces 22 recorded their actual temperatures as did one in the flue gases 20. Two separate channel continuous atomic absorption spectrometers (not shown) (Mercury Instruments, Inc.) provided sufficient sensitivity to establish the overall changes across this central section 16 of the air preheater 10. The two channel sampling trains were equipped with flue gas/fly ash separation probes, mercury speciation trains and heated Teflon sampling lines. These had been used in numerous previous mercury studies and validated using the EPA Method 30B, which is based on an absolute calibration using activated carbon traps. In the present case the measurement of free atomic mercury was only required. As a result the samples were conditioned by standard wet chemical impinger trains. In the present case the gases passed through 10% by weight KCl solutions to dissolve out mercury dichloride and a similar sodium bicarbonate impinger to remove acid gases known to interfere with the atomic absorption measurement of atomic mercury. Fresh and waste solutions were constantly being drawn through these impingers and possible interferences were not evident. Monitoring capabilities were not critical in these tests because the only measurements required were to record a specific change in the level of atomic mercury across the short distance of the inserted section 16. The pivotal concern was that the two separate channels were functioning similarly so that their comparison was meaningful. This was confirmed not only by their similar initial baseline measurements when there was little effect but also easily checked by interchanging the two sampling lines to their respective analyzers. The possibility of absorption on fly ash or some other removal of atomic mercury in transit through this section 16 was eliminated by subsequent tests. Coupled to past experience and the apparent reliability of a well tested analytical train, it did appear that the results were reliable and reproducible. Other extensive monitors on the well instrumented system also continuously recorded oxygen, $SO_2$, CO, NO concentrations, coal feed rates and their stabilities, and temperatures at various other locations to confirm the efficiency and overall stability of operation of the boiler. A limitation of these initial tests was that the experimental section 16 was not as thermally insulated as it could finally be and as a result temperatures did vary slightly between the two ends of this two foot section 16. Nevertheless the data were sufficient to validate the effectiveness of this suggested design.

FIG. 3 illustrates the performance in an initial preliminary test. The average surface temperature across the device 10 is plotted. The economizers of the plant were in operation and as a result it took several hours from turning on the burners in a morning and gradually increasing the appropriate coal feed rates in the system to begin to approach the functioning temperature window. The input mercury level increases as the natural gas flame is gradually replaced by coal. Also, a change begins to be seen between the atomic levels of mercury in the inlet and outlet regions. Moreover, although the HCl concentration in the flue gases with this Eagle Butte coal was no more than about 5 ppmv (parts per million by volume), near the end of the day, conversion became increasingly apparent. Normally, such a low level would produce minimal conversion of atomic mercury to one of its compounds. In this run, an onset temperature (300° F., 150° C.) was noted at about 11:18 am with efficiencies then increasing with temperature through the day. The full range of operational temperatures was not fully reached in this first experiment, but efficiencies of 50% were observed as temperatures of 500° F. (260° C.) were approached.

Before shut down, it was decided to examine for any additional effects by adding supplemental chlorine. As a result, in the remaining hour, traces of molecular chlorine from a certified 4% $Cl_2$ in nitrogen cylinder mixture were bled into the high temperature section of the boiler. This produces HCl instantly in the combustor and subsequently in the downstream flue gases. Additions started at about a 12 ppmv flue gas level of HCl and were gradually increased to 160 ppmv during that time. It was interesting and unexpected to note that the added chlorine did have an effect, increasing the mercury conversion to 60% and then 65%. However, for this large, up to 30-fold increase in chlorine concentration, these were not pronounced increases as one might have expected. It showed a very non-linear behavior with chlorine content. Consequently, it was immediately apparent that conversion was occurring on the stainless steel sheets 22 if such a section was held at a constant temperature and additional surface provided. Also, under these new conditions the system's normal sensitivity to the actual level of chlorine was modified.

Further testing also showed that the conversion was being induced by the presence of the metal sheets 22 and not by the presence of any fly ash in the flue gases. Some tests used sheets 22 of thin stainless steel corrugated and fabricated to be spaced apart from one another. As an extension, 15% of a bituminous Pennsylvanian Bailey coal that had higher chlorine content was blended into the initial low chlorine Eagle Butte source. Mixed well in a large drum for 24 hours, analysis of this blend now indicated a coal containing 210 micrograms/gram of Cl, about a four-fold increase over that used previously. In this case, efficiencies increased to a maximum value of 72% in the vicinity of 500±50° F. (260±30° C.). However, as temperatures rose to 700° F. (370° C.) this efficiency fell away to lower levels. These experiments began to clearly define an optimal operational temperature window of about 500±50° F. (260±30° C.). Again, slight improvements could always be realized by adding extra chlorine but by unexpectedly small amounts. It was obvious that the chlorine levels were not an important part of the mechanism but contributed in some secondary less important manner. The size of the available surface area and the gas/surface collision efficiency were more controlling parameters.

Although only a very limited test program was performed with no attempts made to optimize the system, these results were more than sufficient to prove the operability of the concept and show that a modification of air preheater design in this prescribed manner could be extremely effective at converting and so controlling significant fractions of mercury.

Consider now some further practical issues. Downstream exhaust type air preheaters are widely used to capture waste heat in many environments. In cases where there is no fly ash, or it has already been removed, cleaning is less of a problem. Otherwise, conventional methods generally are applied that invoke soot blowers, sonic cleaners or even washing methods. In the illustrated example, the main illustrated embodiment was shown for a small level of chlorine present. Because mercury levels in coal combustors is measured on a ppbv (parts per billion by volume) level even a concentration of one part per million of chlorine will be two or three orders of magnitude larger in concentration and probably sufficient to convert it to its dichloride. This is very volatile and will flow in the exhaust gases downstream to be controlled either by absorption on particles or scrubbed out with the acid gases. As a result, the illustrated embodiments of the invention will function as a normal preheater with respect to maintenance issues. In a situation with no chlorine at all, the mercury will be retained in the central section on the plates 22 either as mercury oxide or mercuric sulfate. These will be at very low levels and removed with retained ash by scheduled cleaning methods.

The central section 16 of this air preheater 10 will experience an environment similar to its adjoining parts. As a result, the whole preheater 10 will be one unit that has a certain lifetime with normal wear and tear not needing any differing considerations to current models.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

I claim:

1. An apparatus for extracting energy from an exhaust gas and for removal of mercury comprising:
a first section of an exhaust gas heat exchanger for receiving a flow of the exhaust gas, for extracting energy from the exhaust gas and for cooling the exhaust gas to a first predetermined temperature range suited for inducing mercury's heterogeneous chemi-deposition;
a reaction chamber communicating with the first section for receiving the exhaust gas at the predetermined temperature range and providing a predetermined collision frequency of the exhaust gas in the reaction chamber so that a predetermined amount of chemi-deposition of mercury occurs therein; and
a second section of the exhaust gas heat exchanger for receiving the flow of the exhaust gas from the reaction chamber, for extracting energy from the exhaust gas and for cooling the exhaust gas to a second predetermined temperature range for exhaust.

2. The apparatus of claim 1 further comprising removal means for removing one or more mercury compounds from the exhaust gas and/or reaction chamber.

3. The apparatus of claim 1 wherein the reaction chamber is thermally insulated to maintain a predetermined range therein.

4. The apparatus of claim 1 where the first section of an exhaust gas heat exchanger establishes a predetermined temperature range of about 500±50° F. (260±30° C.).

5. The apparatus of claim 1 where the reaction chamber comprises at least one sheet arranged and configured to provide a collision surface for elemental mercury in the exhaust gas.

6. The apparatus of claim 1 where the reaction chamber comprises a plurality of sheets arranged and configured to provide a plurality of collision surfaces for elemental mercury in the exhaust gas.

7. The apparatus of claim 1 where the reaction chamber comprises a plurality of steel sheets arranged and configured to provide a plurality of collision surfaces for elemental mercury in the exhaust gas.

8. The apparatus of claim 1 where the reaction chamber comprises a plurality of corrugated or honeycombed stainless steel sheets providing a plurality of collision surfaces for elemental mercury in the exhaust gas.

9. The apparatus of claim 1 where the reaction chamber comprises a plurality of segmented, corrugated or honeycombed stainless steel sheets providing a plurality of collision surfaces for elemental mercury in the exhaust gas.

10. The apparatus of claim 1 where the reaction chamber comprises a plurality of closely spaced, thin, segmented, corrugated or honeycombed stainless steel sheets providing a plurality of collision surfaces for elemental mercury in the exhaust gas.

11. The apparatus of claim 1 where the reaction chamber comprises a plurality of sheets arranged and configured to provide on the average five or more collisions with the sheets for each atom of elemental mercury in the exhaust gas.

12. The apparatus of claim 1 where the reaction chamber comprises a plurality of sheets arranged and configured to substantially reduce streamline flow of the exhaust gas over the sheets and increase the gas/surface collision frequency.

13. The apparatus of claim 1 where the second section of the exhaust gas heat exchanger cools the exhaust gas to about 360° F. (180° C.) or less.

14. The apparatus of claim 1 further comprising a cold-side electrostatic precipitator, a fabric filter bag, or a lime scrubber.

15. A retrofitted modification of a previously installed exhaust gas preheater arranged and configured to provide an exhaust gas flow with a predetermined temperature range comprising:
   a configuration of the preheater to provide an exhaust flow in the temperature range of about 500±50° F. (260±30° C.);
   a reaction chamber communicating with the configured preheater for receiving the exhaust gas at the predetermined temperature range that provides a predetermined collision frequency of the exhaust gas in the reaction chamber so that a predetermined amount of chemi-deposition of mercury occurs therein; and
   an exhaust gas heat exchanger for receiving the flow of the exhaust gas from the reaction chamber, for extracting energy from the exhaust gas and for cooling the exhaust gas to a predetermined temperature range for exhaust.

16. A method for extracting energy from an exhaust gas and for removal of mercury comprising:
   extracting energy from the exhaust gas to cool the exhaust gas to a first predetermined temperature range suited for inducing mercury's heterogeneous chemi-deposition;
   reacting the cooled exhaust gas at the predetermined temperature range by collision of the exhaust gas with one or more surfaces whereon chemi-deposition of mercury occurs; and
   extracting energy from the reacted exhaust gas to cool the reacted exhaust gas to a second predetermined temperature range for exhaust.

17. The method of claim 16 further comprising removing one or more mercury compounds from the exhaust gas and/or reaction chamber.

18. The method of claim 16 where extracting energy from the exhaust gas to cool the exhaust gas to a first predetermined temperature range for chemi-deposition comprises cooling the exhaust gas to a temperature range of about 500±50° F. (260±30° C.).

19. The method of claim 16 where reacting the cooled exhaust gas at the predetermined temperature range by collision of the exhaust gas with one or more surfaces whereon chemi-deposition of mercury occurs comprises providing on the average five or more collisions with the sheets for each atom of elemental mercury in the exhaust gas.

20. A method of retrofitting a previously installed exhaust gas preheater arranged and configured to provide an exhaust gas flow with a predetermined temperature range comprising:
   adjusting the preheater to provide an exhaust flow in the temperature range of about 500±50 (260±30° C.);
   communicating a reaction chamber with the configured preheater for receiving the exhaust gas at the predetermined temperature range to provide a predetermined collision frequency of the exhaust gas in the reaction chamber with available surfaces provided therein whereon chemi-deposition of mercury occurs; and
   communicating an exhaust gas heat exchanger with the reaction chamber for receiving the flow of the exhaust gas from the reaction chamber, for extracting energy from the exhaust gas and for cooling the exhaust gas to a predetermined temperature range for exhaust.

* * * * *